(12) United States Patent
Udapi Rao Kulkarni et al.

(10) Patent No.: US 11,782,261 B2
(45) Date of Patent: Oct. 10, 2023

(54) VISIBILITY CONTROLLING DEVICE

(71) Applicant: CENTRE FOR NANO AND SOFT MATTER SCIENCES, Bangalore (IN)

(72) Inventors: Giridhar Udapi Rao Kulkarni, Bangalore (IN); Ashutosh Kumar Singh, Bangalore (IN); Rahul Muthukumaran, Bangalore (IN)

(73) Assignee: CENTRE FOR NANO AND SOFT MATTER SCIENCES, Bangalore (IN)

( * ) Notice: Subject to any disclaimer, the term of this patent is extended or adjusted under 35 U.S.C. 154(b) by 380 days.

(21) Appl. No.: 17/281,800

(22) PCT Filed: Sep. 16, 2019

(86) PCT No.: PCT/IB2019/057762
§ 371 (c)(1),
(2) Date: Mar. 31, 2021

(87) PCT Pub. No.: WO2020/070568
PCT Pub. Date: Apr. 9, 2020

(65) Prior Publication Data
US 2021/0389583 A1     Dec. 16, 2021

(30) Foreign Application Priority Data
Oct. 1, 2018   (IN) .............................. 201841037142

(51) Int. Cl.
*G02B 26/00*   (2006.01)
*C08K 5/18*   (2006.01)
(Continued)

(52) U.S. Cl.
CPC .............. *G02B 26/004* (2013.01); *C08K 5/18* (2013.01); *C08K 5/3447* (2013.01);
(Continued)

(58) Field of Classification Search
CPC ........ G02B 26/004; G02F 1/19; E06B 3/6722
See application file for complete search history.

(56) References Cited

U.S. PATENT DOCUMENTS

| | | |
|---|---|---|
| 2,783,682 A | 3/1957 | Swenson |
| 3,761,165 A | 9/1973 | Besnard |
(Continued)

FOREIGN PATENT DOCUMENTS

| | | |
|---|---|---|
| CN | 101833211 A | 9/2010 |
| CN | 103197438 A | 7/2013 |
(Continued)

OTHER PUBLICATIONS

International Search Report as issued in International Patent Application No. PCT/IB2019/057762, dated Oct. 18, 2019.
(Continued)

*Primary Examiner* — Joseph P Martinez
(74) *Attorney, Agent, or Firm* — Pillsbury Winthrop Shaw Pittman LLP

(57) ABSTRACT

A visibility controlling device with switchable transparency. This design of visibility controlling device is economical and can be operated manually or under electric power. The time for switching from translucent to transparent state requires about 5-30 seconds.

16 Claims, 13 Drawing Sheets

(51) Int. Cl.
  *C08K 5/3447* (2006.01)
  *E06B 3/67* (2006.01)
  *E06B 9/24* (2006.01)

(52) U.S. Cl.
  CPC .............. *E06B 3/6722* (2013.01); *E06B 9/24* (2013.01); *E06B 2009/2411* (2013.01)

(56) References Cited

U.S. PATENT DOCUMENTS

| | | |
|---|---|---|
| 5,270,843 A | 12/1993 | Wang |
| 6,429,961 B1 | 8/2002 | Harary et al. |
| 2012/0308724 A1 | 12/2012 | Hellring |
| 2012/0324806 A1 | 12/2012 | Chen |
| 2013/0242370 A1 | 9/2013 | Wang |
| 2014/0047783 A1* | 2/2014 | Shalit .................... E06B 3/6722 52/171.3 |
| 2018/0067212 A1 | 3/2018 | Wilson |

FOREIGN PATENT DOCUMENTS

| | | |
|---|---|---|
| JP | 2014-134676 A | 7/2014 |
| KR | 10-1792403 | 11/2017 |

OTHER PUBLICATIONS

Park, S., et al., "Micro-optical pattern-based selective transmission mechanism," Applied Optics, vol. 55, No. 9, Mar. 2016, pp. 2457-2462.
Wolfe, D., et al., "Evaluation of 3D printed optofluidic smart glass prototypes," Optics Express, vol. 26, No. 2, Jan. 2018, pp. A85-A98.
Soldatović, D., et al., "Effects of solid poly (ethylene glycols) addition to the solutions of aniline or $N,N$-dimethylaniline with water: Experimental measurements and modelling," Journal of the Serbian Chemical Society, vol. 81, No. 7, Aug. 2016, pp. 789-798.
Grozdanić, N. D., et al., "Cloud Point Phenomena in the (Aniline or $N,N$-Dimethylaniline + Water) Solutions, and Cosolvent Effects of Liquid Poly(ethylene glycol) Addition: Experimental Measurements and Modeling," Journal of Chemical & Engineering Data, vol. 60, No. 3, Jan. 2015, pp. 493-498.

* cited by examiner

| Type of glasses used for device making | Transparency and clarity | Liquid drop retention in translucent state |
|---|---|---|
| Metal Grit blasted glasses |  |  |
| Coarse Sand blasted Glasses |  |  |
| Fine Sand blasted Glasses |  |  |
| Textured glasses |  |  |

(a)

VISIBILITY CONTROLLING DEVICE

CROSS-REFERENCE TO RELATED APPLICATIONS

This application is the U.S. National Stage of PCT/IB2019/057762, filed Sep. 16, 2019, which in turn claims priority to Indian patent application number 201841037142 filed Oct. 1, 2018. The content of these applications are incorporated herein by reference in their entireties.

TECHNICAL FIELD

The present invention is about visibility controlling device. In particular, the present invention relates to visibility controlling device with a toggle option between translucent and transparent states in selected areas. More specifically, the present invention provides a smart visibility controlling device involving controlled transmission of light by refractive index matching of the components-etched panes of glass/polymer and liquid composition. The method involves controlling the quantity and flow of liquid composition between the etched panes with or without interference of electric power.

BACKGROUND AND PRIOR ART

At present, there is a huge demand for smart partition panels to serve as wide area switchable gates for light transactions with the external world. It is quite common to find any polymer material or glass as partition without any additional functionality in office and houses at appropriate places. The control of light transmission thereby the privacy, however has been a challenge and quite often it varies with the specific nature of the partition. The conventional methods of privacy setting widely used are permanent fixtures such as blinds, screens, curtains, shutters, obscure glasses or such combinations thereof. These methods although enhance privacy, they occupy internal space, require frequent and inconvenient cleaning and there is need of artificial light despite high exterior light availability. Use of obscure glass offer no user control on the degree of transparency.

Smart windows or switchable transparency windows have been developed which become opaque to block or reflect sunlight on blazing days thereby saving energy and costs of cooling devices and return to a transparent state during low light conditions to enhance freely available natural light harvesting and to catch free warmth from the sun. Inventions utilizing only the concept of refractive index matching to modulate the optical transmission has been described in U.S. Pat. No. 2,783,682A and CN103197438 to invent smart dimming glass using Carbon tetrachloride as the base liquid which is a well-known greenhouse gas and a heap toxin along with o-dichlorobenzene which is known to cause sporadic irritation of the eyes and respiratory tract. These devices suffer from blemish pattern formation and produced ripping like appearance for the translucent state while switching between on/off states. Use of electrochromic material for switchable windows has been described in CN101833211A and US20130242370A1. The tunable smart windows utilizing these electrochromic material offers visible light transmittance only to 3.5-62%, is prone to high solar absorbance, scalability issues, prolonged switching time as cycling increases, high capital cost and requires voltage application not only to toggle transparency but also to retain the state. The invention in JP2014134676A utilizes gas chromic material for reversing transparency by hydrogenation/dehydrogenation using Hydrogen gas which requires well controlled gas exchange system. The stability of these devices still needs improvement. Photochromic material as utilized in U.S. Pat. No. 3,761,165A and thermochromic used in KR101792403 for making smart glass although doesn't require electricity for toggling of transparency but suffer from cyclic instability and poor transmittance.

Polymer dispersed liquid crystals (PDLC) as discussed in U.S. Pat. No. 5,270,843 are subject to poor UV and temperature stability, and the "self-transparency" effect. They are subject to low transmittance modulation of 50-80% between the off/on states at increased wavelength of light due to reduced backscattering. The associated problems with suspended particle devices as described in U.S. Pat. No. 6,429,961B1 for generating smart retrofitting windows are long-term instability, cyclical non-durability, particle settling, and agglomeration. Both liquid crystal devices and suspended electrical devices require constant power supply with average consumption of 20 Watts/m$^2$. Commonly used transparent conductor in said devices, Tin doped Indium oxide is very expansive due to high demand supply ration of Indium. These transparent conductor films are liable to haze and thus reduce the overall optical transmittance due to scattering losses. Other associated challenges with the manufacturing of transparent conductors include large-area production and scalability.

Sangki Park and Sun-Kyu Lee (Applied Optics Vol. 55, Issue 9, pp. 2457-2462 (2016)) describe a micro-optical pattern-based selective transmission mechanism composed of a patterned plate and deionized water as liquid medium to get energy saving, environmentally benign switchable glass. However, the use of ultraprecision diamond-cutting machine to generate the patterns makes the invention costly and unsuitable for manufacturing larger sized partitions. Daniel Wolfe and K. W. Goossen (Optics Express Vol. 26, Issue 2, pp. A85-A98 (2018)) devised a novel optofluidic smart glass utilizing 3D printed geometric optics and a viscous optofluid methyl salicylate. 3D printed photopolymer and methyl salicylate which is potentially deadly, especially in the pediatric population, makes the invention very costly and hazardous.

The present invention aims to circumvent the setbacks associated with the known toggling devices, and develop a cost-effective, size flexible, recyclable, negligible power consuming smart visibility controlling device which are scalable to be manufactured on industrial scale.

BRIEF DESCRIPTION OF FIGURES

The features of the present invention can be understood in detail with the aid of appended figures. It is to be noted however, that the appended figures illustrate only typical embodiments of this invention and are therefore not to be considered limiting of its scope for the invention.

SUMMARY OF INVENTION

Accordingly, the invention provides a synergistic liquid composition comprising aromatic amine ranging from 10%-90% by volume and polymer ranging from 90%-10% by volume for adopting in a visibility controlling device (A).

The invention also provides a visibility controlling device (A) with controlled regions of opacity and transparency comprising synergistic liquid composition of aromatic amine ranging from 10%-90% by volume and polymer ranging from 90%-10% by volume; wherein a framework formed by two transparent [1 and 3] sheets juxtaposed, with one sheet roughened on one side [1] glued together and sealed by glue [6] with a gap [9] through a spacer [2] and a hole for breathing [5]; wherein said framework is connected through inlet/outlet [4] port to a liquid pumping station [8] filled with the synergistic liquid composition.

DESCRIPTION OF DISCLOSURE

The invention provides a smart partition device fabricated by simple methodology which can change from transparent to translucent or vice versa by filling or withdrawing a liquid of unique composition and unique method of device construction.

The foregoing description of the embodiments of the invention has been presented for the purpose of illustration. It is not intended to be exhaustive or to limit the invention to the precise form disclosed as many modifications and variations are possible in light of this disclosure for a person skilled in the art in view of the figures, description and claims. It may further be noted that as used herein and in the appended claims, the singular forms "a", "an", and "the" include plural reference unless the context clearly dictates otherwise. Unless defined otherwise, all technical and scientific terms used herein have the same meanings as commonly understood by person skilled in the art.

One aspect of the invention is the liquid composition (M) comprising aromatic amine ranging from 10%-90% by volume and polymer ranging from 90%-10% by volume for adopting in a visibility controlling device (A).

In one embodiment of the present invention, the aromatic amine is Aniline and polymer is polyethylene glycol.

In another embodiment of the present invention, the composition is optionally coloured composition (M1) formed with a colouring compound selected from a group but not limiting to 2-(1,3-dihydro-3-oxo-2H-indazol-2-ylidene)-1,2-dihydro-3H-indol-3-one; 2,2'-Bis(2,3-dihydro-3-oxoindolyliden) and the like In another embodiment of the present invention, the refractive index of the liquid composition is ranging from 1.480 to 1.580.

Another aspect of the invention is a visibility controlling device (A) with controlled regions of opacity and transparency comprising synergistic liquid composition of aromatic amine ranging from 10%-90% by volume and polymer ranging from 90%-10% by volume.

Figure 1:
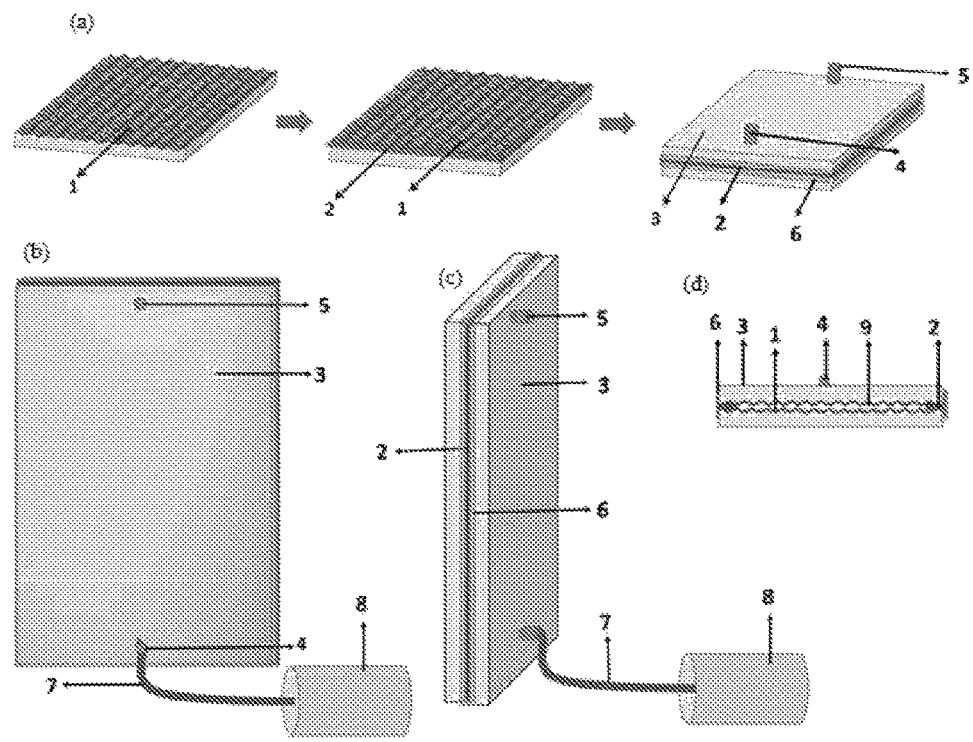
FIG. 1 depicts a) the fabrication steps of the device, b) front view of the device, c) tilt view of the device and d) the cross-sectional view of the device from top.
Figure 7:
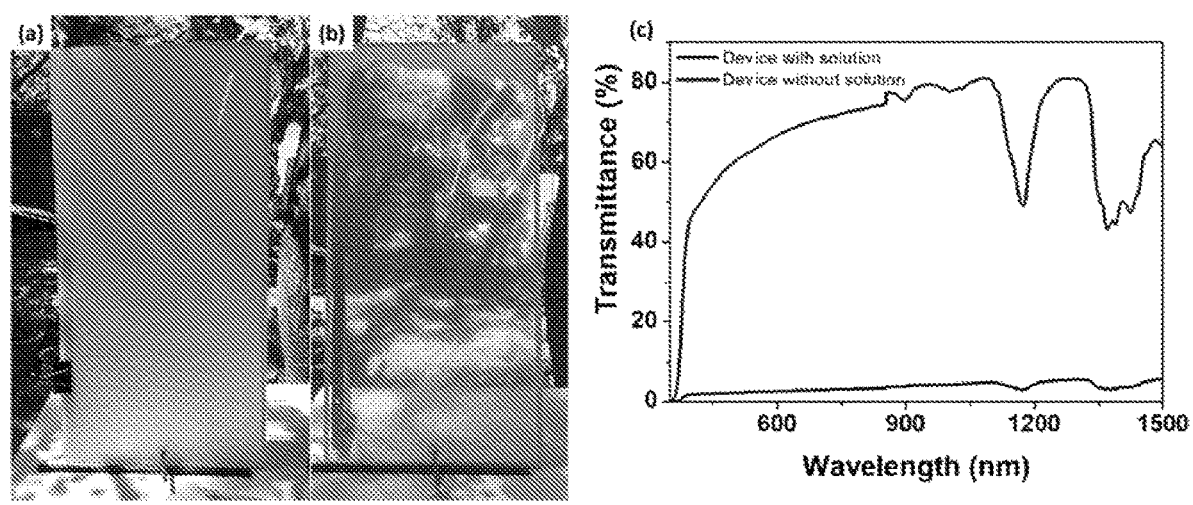
FIG. 7 shows the toggling between translucent and transparent states of the device made of acrylic based material wherein (a) is translucent state, (b) is transparent state after filling liquid (c) shows the transmittance of the device in both translucent and transparent states.

The device material to form one-side roughened otherwise transparent sheet is chosen from group comprising glass, polymer like Polyethylene terephthalate, or Acrylic sheet like Polymethyl methacrylate. For exemplary purpose device made of Glass is described in FIG. 1 and device made of Acrylic sheet is described in FIG. 7. Referring to FIG. 1(a), the device fabrication involves one side roughened transparent sheet (1) placed on another one side roughened or smooth sheet (3) and fastened using transparent glue (6) by putting a spacer (2) made of polyvinyl chloride or polyethylene terephthalate to create avoid (9) between the composite sheets. The composite sheet is sealed from the sides to block the cavity from all sides leaving a hole for air breathing (5) and an option for inlet/outlet (4) to the flat surface of the sheet for flow of liquid (M). There is provided a liquid pumping station (8) connected via connector pipes (7) to the inlet/outlet port (4) of the device. The device may be operated manually or through electrical means.

The device toggle option between opaque (T~10%) and transparent states (T~85%) in selected areas comprising of a microfluidic cavity formed by two (1) and (3), one-side roughened (1) otherwise transparent sheets fastened together. The cavity is filled by pumping appropriately with a liquid whose refractive index is accurately matched with that of the transparent sheet, thus rendering light transmission through the cavity, in spite of the internal wall roughness. When devoid of the liquid, the cavity becomes translucent due to light scattering from the roughened internal wall surfaces. The device also provides toggle option between translucent and transparent states in selected areas—top to bottom, bottom to top, sideways, or specific regions. The translucent state native to the roughened surface may be retained by avoiding liquid entry in the background of selected region thus generating desired translucent patterns in the background of transparent state or vice versa.

In one embodiment of present invention, the void between the sheets ranges from 100 μm to 500 μm.

In another embodiment of present invention, the spacer is selected from a group comprising but not limited to Polypropylene sheet and polyethylene terephthalate.

In another embodiment of present invention, the transparent glue is selected from a group comprising polyurethane-based glue, epoxy-based glue, α-cyanoacrylate based glue and silicon-based glue.

In another embodiment of present invention, the liquid composition is selected from a group comprising colourless composition (M) and coloured composition (M1).

Figure 2:
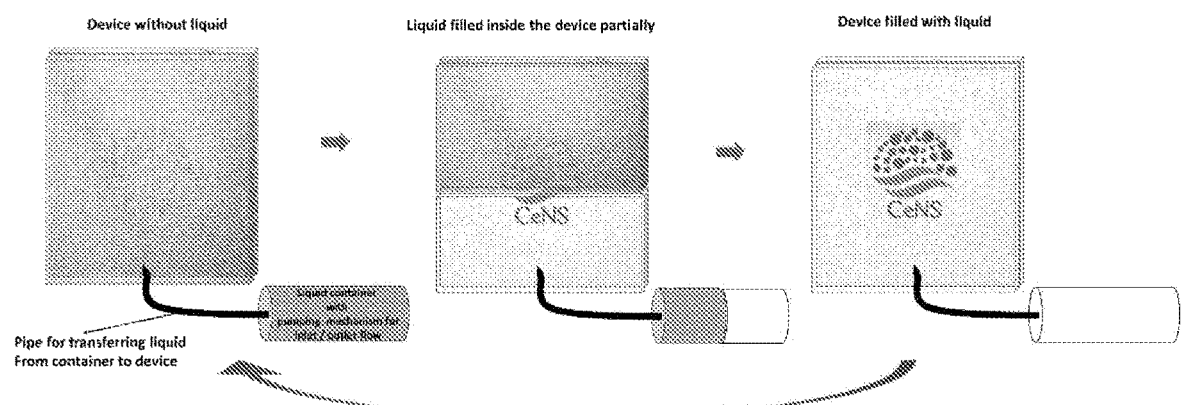
FIG. 2 shows device functioning steps as a) Full Opaque State; b) Partial Transparent/Opaque state; and c) Full Transparent State

The transparent sheet due to presence of roughness in at least one of the transparent sheets appears translucent in normal condition (FIG. 2(a)). When the liquid with unique composition starts being filled into the gap created due to spacer (3) the transparency gradually changes (FIG. 2(b)) and when the gap is fully filled with the novel liquid composition the window becomes full transparent (FIG. 2(c)). The cavity formed is filled with the liquid (M) either manually or by electronic pumping.

Figure 8:
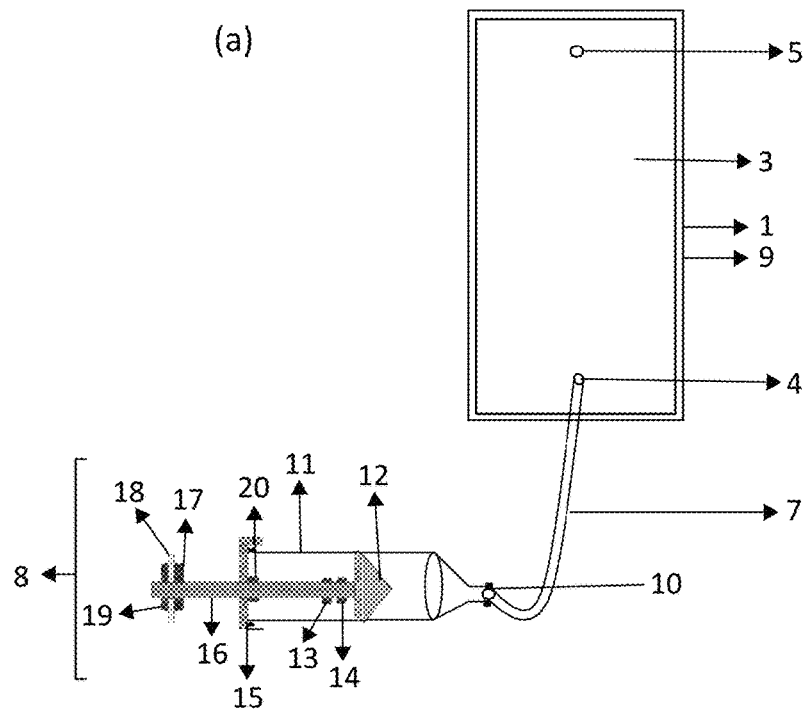
FIG. 8 shows the device with piston-based pumping mechanism. (a) schematic diagram, (b) is device in translucent state, (c) is device in half translucent/transparent state, (d) is device in full transparent state, and (e) shows detailed manual piston mechanism to fill the attached device with liquid using piston (Syringe).
Figure 8:
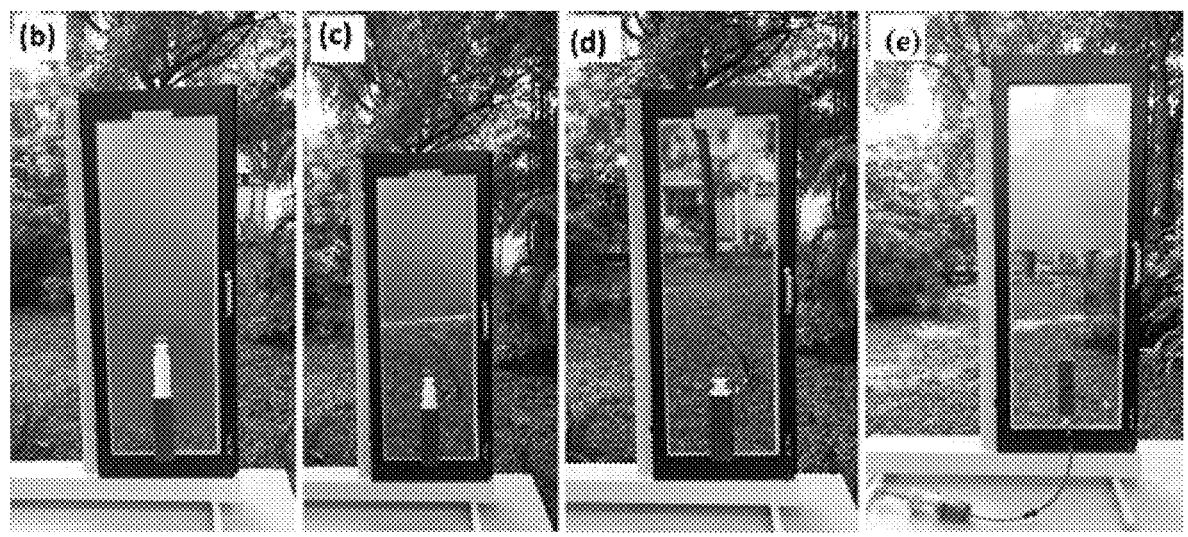

The manual method may involve piston-based mechanism (FIG. 8), bellow compression and expansion mechanism or air compression-based mechanism.

Referring to FIG. 8(a), the liquid pumping station [8] having piston based mechanism comprises connector to connect pipe [10] to syringe pumping system, piston-Syringe wall [11], piston rod head [12] for pushing/pulling liquid purpose, nut [13] for tightening piston rod head, nut [14] that tighten in opposite direction to 7 to make it fix while piston rotation, cover of piston wall [15] with thread opening to allow piston rod with ration option, piston rod [16], nut for tightening piston rod rotation holder [17], piston rod rotation holder [18], nut [19] that tighten in opposite direction to [11] to make it fix while piston rotation of piston rod holder and thread holder for piston rod [20]. The device is operated manually with the rotation of piston rod holder [18] in clockwise/anti-clockwise the piston rod head [12] push or pull the liquid inside the device, respectively, which switches the state from translucent to transparent state and vice-versa.

In one embodiment of the present invention, visibility is controlled from top to bottom, bottom to top, sideways, specific regions or combination thereof.

In another embodiment of the present invention, the transparent sheets are selected from a group of material comprising glass, polymer and acrylic sheet.

In yet another embodiment of the present invention, the roughness of the transparent sheet is ranging from 10 nm to 3 μm.

In yet another embodiment of the present invention, the transparent glue is selected from a group comprising polyurethane-based glue, epoxy-based glue, α-cyanoacrylate based glue and silicon-based glue.

In yet another embodiment of the present invention, the spacer is selected from a group comprising polyethylene terephthalate and polypropylene sheet.

In yet another embodiment of the present invention, the gap between the sheet ranges from 10 μm to 500 μm.

The visibility controlling device as claimed in claim 5, wherein the visibility is uniformly maintained by the flow of liquid with speed ranging from 1 cm$^3$/s to 100 cm$^3$/s.

In yet another embodiment of the present invention, the pumping station (8) is controlled by manual pumping and/or electrical pumping mechanism.

Referring to FIG. 9(a), bellow compression/expansion based pumping station [8] comprises rotation rod [21], metal gasket to prevent rotation rod from pulling off from the system due to natural bellow expansion [22], rotation rod holder to hold and rotate[23], outer casing for bellow compression/expansion pumping system [24], bellow holder [25], bellow [26], bellow mouth connector [27], rod holder [28], nut holder which holds nut with thread [29], nut with thread which allows rotation of rod [31], space inside the bellow where liquid M is filled [32] and hole in the glass [4] where bellow mouth [27] gets connected to the device. Rod holder [28] on the glass which allows rod to rotate freely while rod rotation and bellow holder [26] does UP/DOWN motion while rotating the rotation rod holder in clockwise and anti-clockwise, respectively. This action reflects to the bellow compression/expansion mechanism with rod rotation.

Referring to FIG. 10(a), the liquid pumping station [8] having air pressure induced flow mechanism comprises manual or electrical air compressor [33], non-returning valve [34], liquid container [36], air valve [37] and T-junction of the pipe [38].

In yet another embodiment of the present invention, the device transmits light ranging from 80% to 90% in transparent state and 5% to 10% in translucent state.

In yet another embodiment of the present invention, wherein the device blocks 99% to 100% of UV rays and 25% to 30% of IR rays.

The liquid (M) is synergistic mixture of two liquid components A and B wherein component A is selected from group of aromatic amine preferably Aniline and component B is selected from polyether preferably polyethylene glycol (PEG200) which are mixed together in fixed ratio to form M. The ratio of the mixture solution of component A to B and B to A can range from 10% to 90% by volume percent. The mixture M formed using component A and component B has refractive index equal to refractive index of the roughened transparent sheet of the device.

To prepare composition M, component A and component B are taken in particular volume ratio (as shown in Table 1) and mixed together to form homogenous synergistic mixture and refractive index values is calculated by Abbes's method shown in Table 1.

TABLE 1

| Calculation of refractive index for differential compositions | | |
|---|---|---|
| Component A (Vol. %) | Component B (Vol. %) | Refractive Index |
| 10 | 90 | 1.578 |
| 30 | 70 | 1.553 |
| 40 | 60 | 1.536 |
| 50 | 50 | 1.523 |
| 51.33 | 48.66 | 1.522 |
| 55 | 45 | 1.518 |
| 57.5 | 42.5 | 1.516 |
| 60 | 40 | 1.511 |
| 65 | 35 | 1.509 |
| 70 | 30 | 1.501 |
| 90 | 10 | 1.487 |

Figure 3:
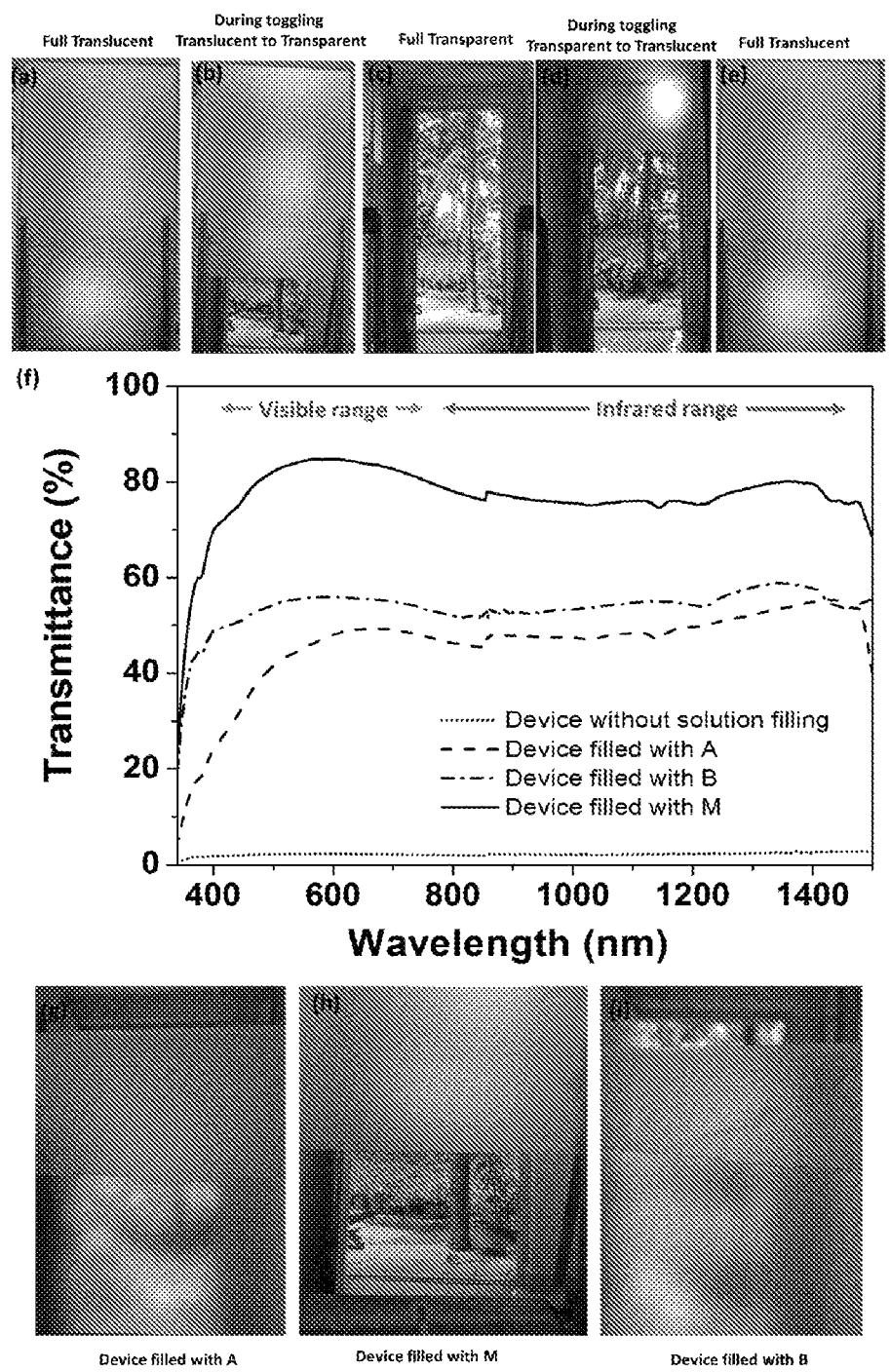
FIG. 3 shows the process of toggling from translucent to transparent state (a) Device in complete translucent state (no liquid filled inside); (b) Device toggling translucent to transparent state (Partial liquid filled inside the device); (c) Device in complete transparent state (Liquid is completely filled inside the device); (d) Device toggling transparent to translucent state (Partial liquid filled inside the device); (e) Device in complete translucent state (no liquid filled inside); (f) Transmittance plot of device indifferent state for a given range of wavelength; digital image of device filled with (g) Component A, (h) Liquid composition M (i) Component B.

Altering the ratio of component, A and component B to form composition M resulting in different transmittance are shown in FIG. 3(g)-3(i). It is noted that the ratio of component A to component B 51.33:48.66 provides best result as depicted in FIG. 3f. The refractive index of composition M with particular ratio A and B that perfectly matches with the refractive index of the roughened glass and give maximum transparency is chosen for all other experiments. The toggling observed by using composition M (that provides best transmittance) in the fabricated device is shown in FIG. 3(a)-3(e).

The device can be made colourful as well depending on requirement by using a liquid composition (M1). M1 comprises two liquid components A and B and any coloured ink selected from a group comprising but 2-(1,3-dihydro-3-oxo-2H-indazol-2-ylidene)-1,2-dihydro-3H-indol-3-one; 2,2'-Bis(2,3-dihydro-3-oxoindolyliden) and the like which are mixed together in fixed ratio (A:B of 51.33:48.66 Vol. % to form mixture M and added coloured ink in ratio M:ink of 90:10 Vol. %, the final coloured mixture is M1) to form M1 wherein component A is selected from group of aromatic amines preferably Aniline, component B is selected from polyether preferably polyethylene glycol (PEG200). The refractive index of composition M1 with particular ratio A and B with coloured ink perfectly matches with the refractive index of the roughened glass/acrylic sheet and give maximum transparency.

The time for switching between the transparent and translucent states vary on the speed of the liquid flow in and out of the device. Therefore, varied flow can produce contrast in the switching states. It is observed that the switchability is uniformly maintained by the flow of liquid with speed ranging from 1 $cm^3$/s to 100 $cm^3$/s and the time for switching from translucent to transparent state or transparent state to translucent requires about 5-30 seconds.

Figure 4:
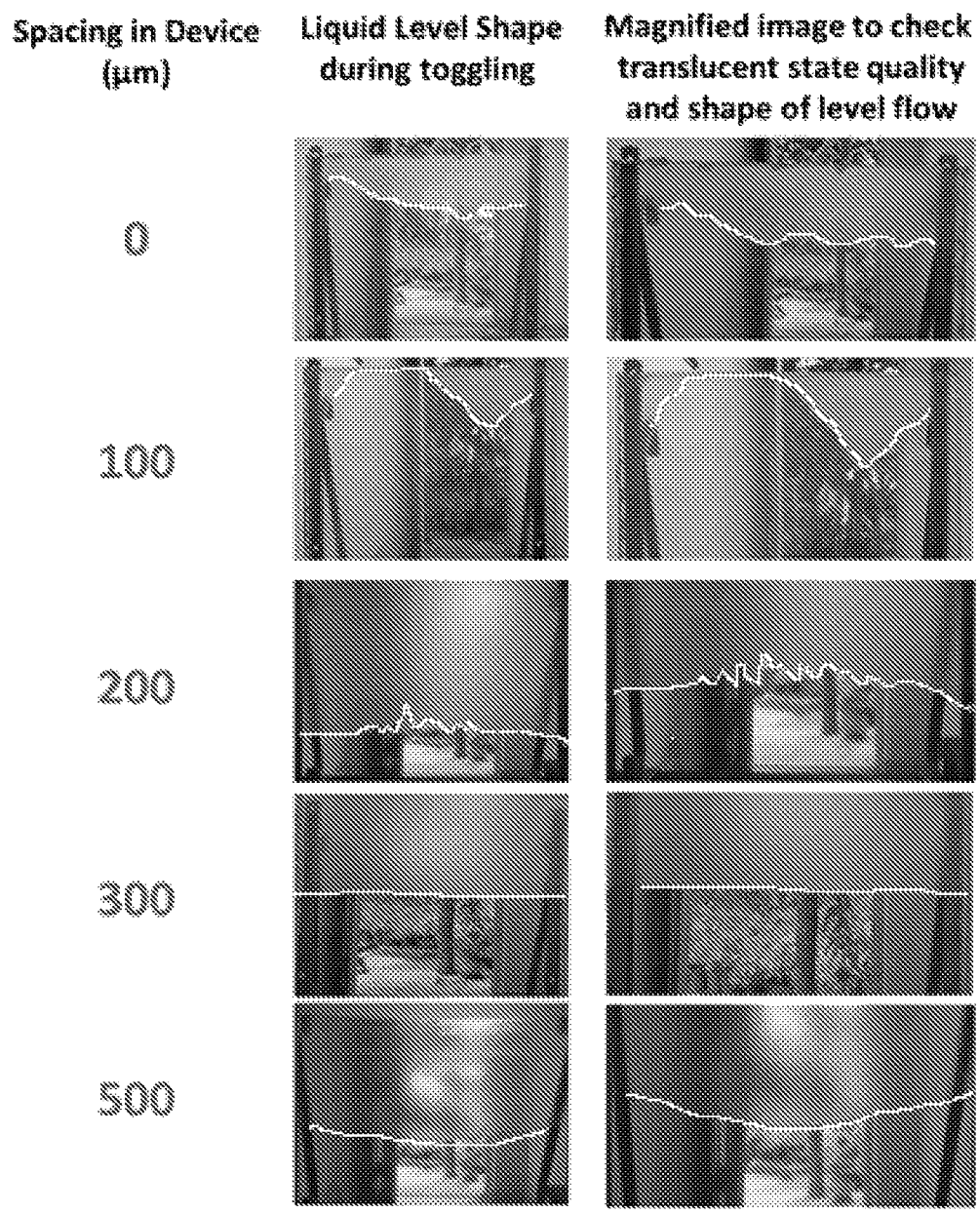
FIG. 4 depicts the toggling transparent to translucent state of the device made using various thickness of spacers (0, 100, 200, 300, 500 μm)

While dropping the liquid level to convert from transparent to translucent state, the narrower the gap is, drier is the translucent state. For larger spacings the state is wetty and can be having dripping situation depending upon how large is the spacing. More the state is wetty, more is the time taken to go to the dry state. Due to increased wetness because of larger spacing the dripping can have non-repeatable dripping patterns. Drier the translucent state is the defects born out of surface scratches and defect particles if any are self-healed. However, liquid level may be uneven in dry state and non-repeatable, while for wetty states with large spacings, the liquid level is perfectly horizontal. For the purpose of glass-based device, the cavity size can range from 200-350 μm. Optimal conditions indicate a spacing of 300-350 um (FIG. 4), so as to achieve enough dryness of the state, which is self-healing while maintaining a liquid level. Slower the drop in the liquid level, drier is the state achieved. Therefore, varied liquid discharge can produce contrast in the dry state.

The quality of transparency also depends on type of surface roughness and morphology of the transparent sheet because of varying retention property of the liquid on to the roughened surface. The roughened glass comprises metal grit blasted glass, coarse sand blasted glass, fine sand blasted glass and textured glass by thermal imprinting (table 2).

TABLE 2

Types of glass and roughness

| Sl No | Type of glass | Explanation ad remarks |
|---|---|---|
| 1 | Metal grit blasted glass | Roughness approximately 7 μm; Non-uniformity in roughness over large area |
| 2 | Coarse sand blasted glass | Roughness approximately 4 μm; Non-uniformity in roughness over large area |
| 3 | Fine sand blasted glass | Roughness approximately 1 μm; uniformity in roughness over large area |
| 4 | Textured glass | Roughness approximately 135 μm; uniformity in roughness over large area |

Figure 5:
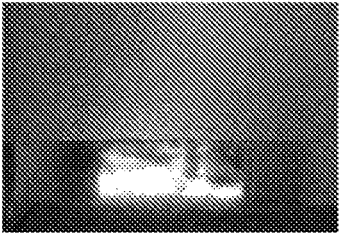
FIG. 5 shows the toggling between translucent and transparent states of the device made using various kind of glasses (grid blasted, sand blasted, laser patterned).
Figure 5:
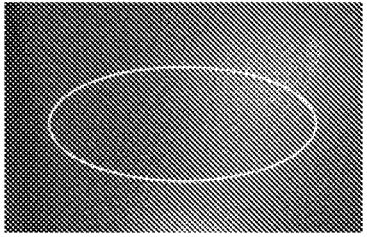
Figure 5:
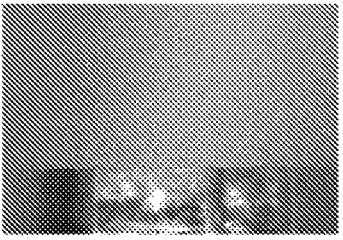
Figure 5:
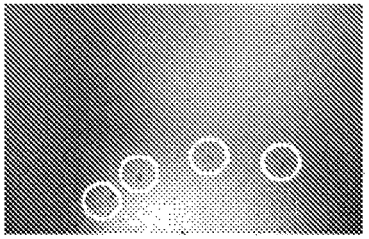
Figure 5:
Figure 5:
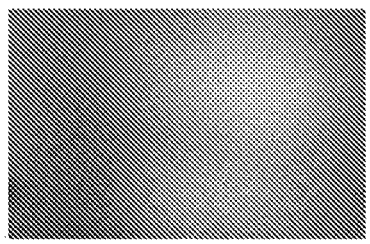
Figure 5:
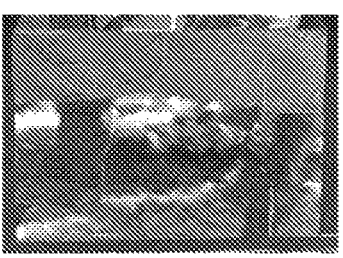
Figure 5:
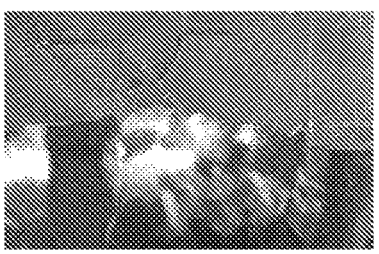
Figure 6A:
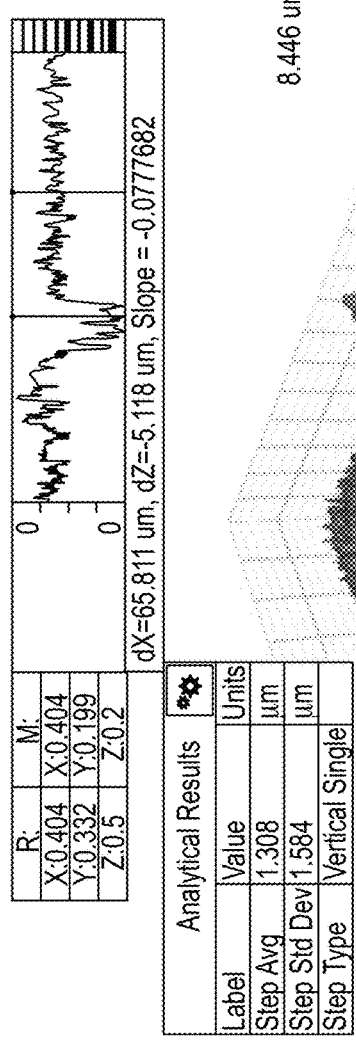
FIG. 6 shows optical profiler and scanning electron microscopy images of roughened glass created by various methods a) grit blasting b) coarse sand blasting c) fine sand blasting and d) LASER ablation.
Figure 6A:
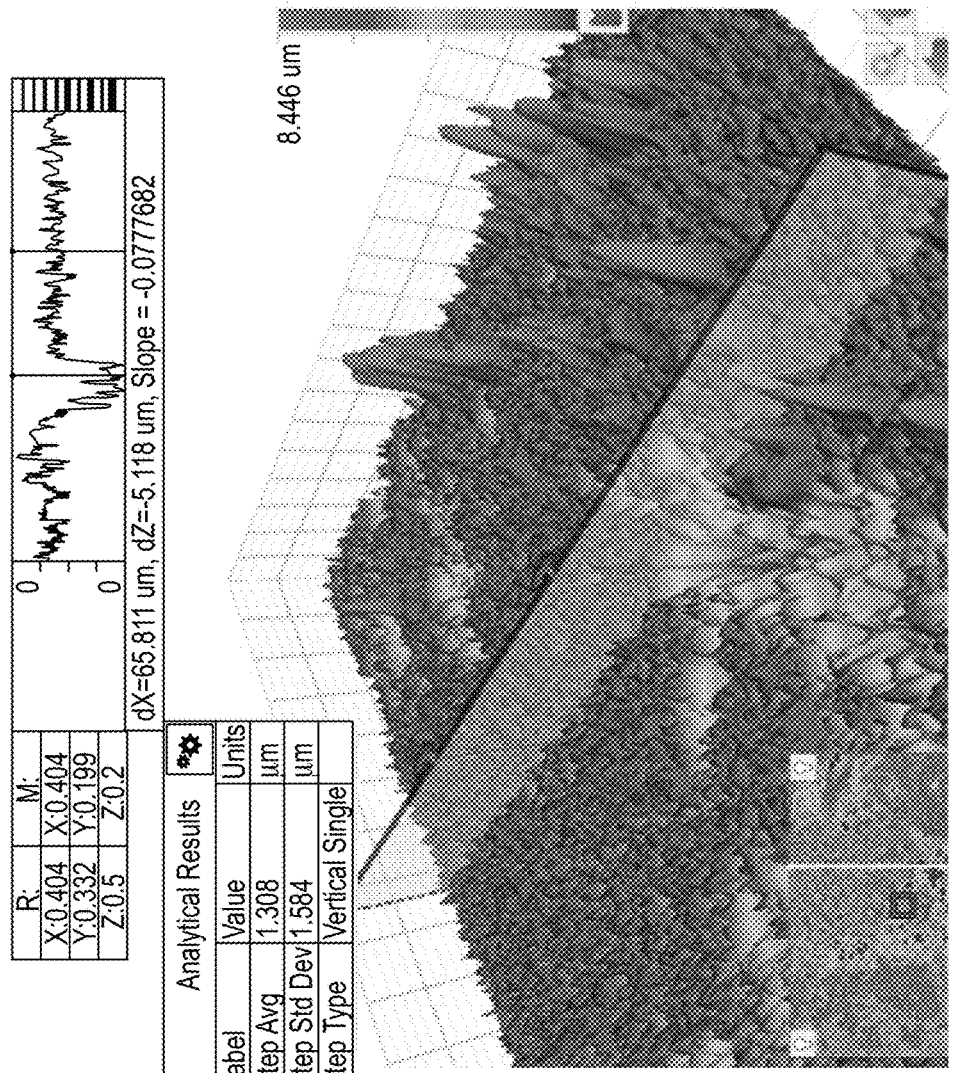
Figure 6B:
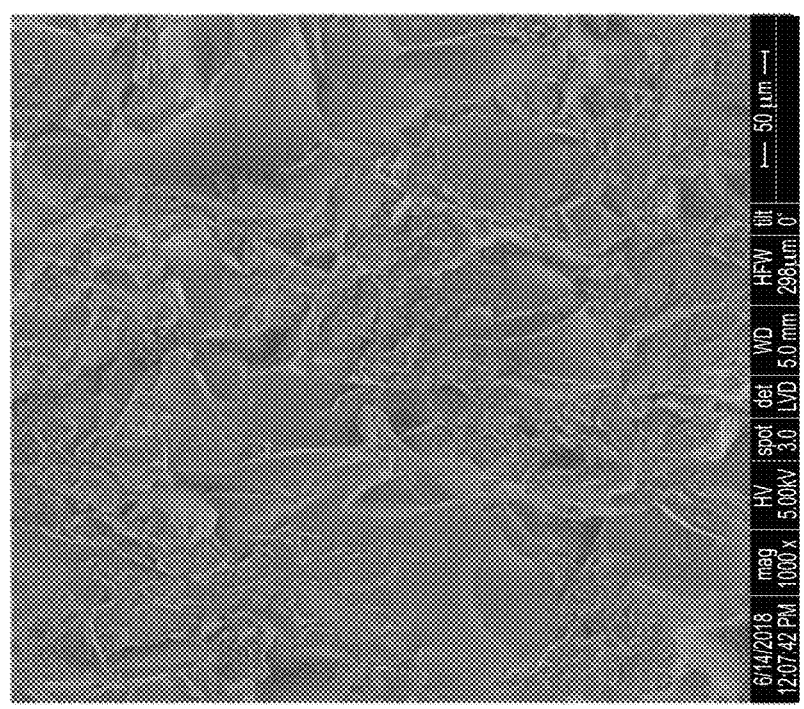
Figure 6B:
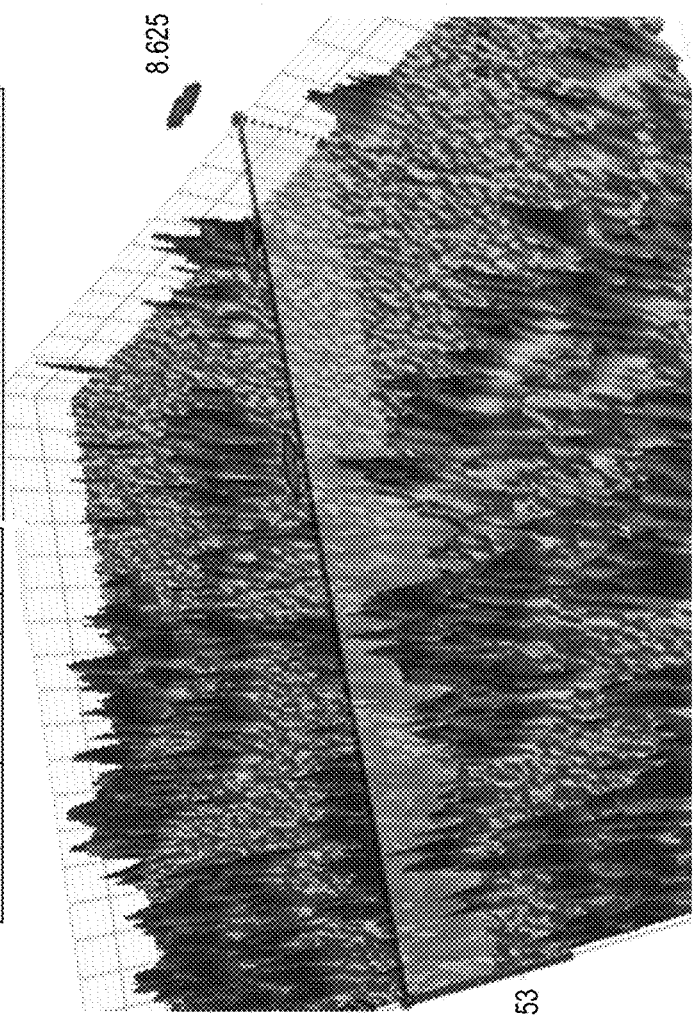
Figure 6C:
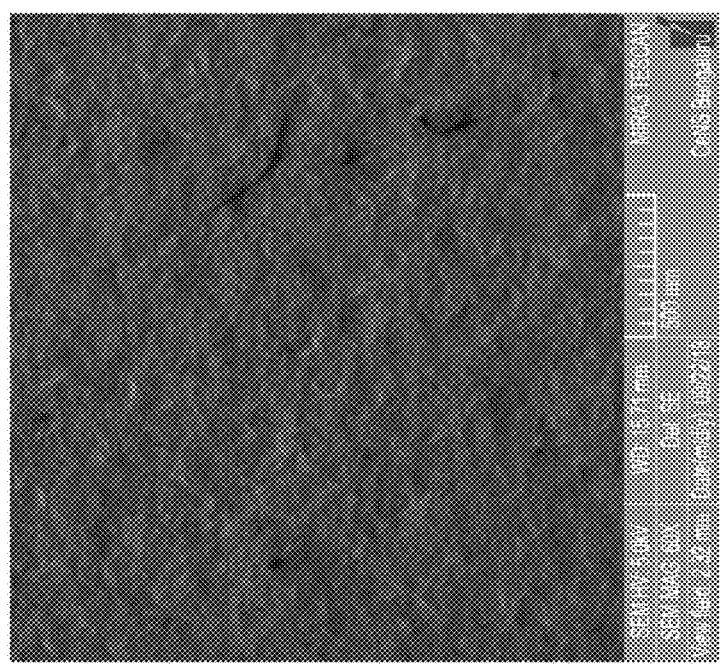
Figure 6C:
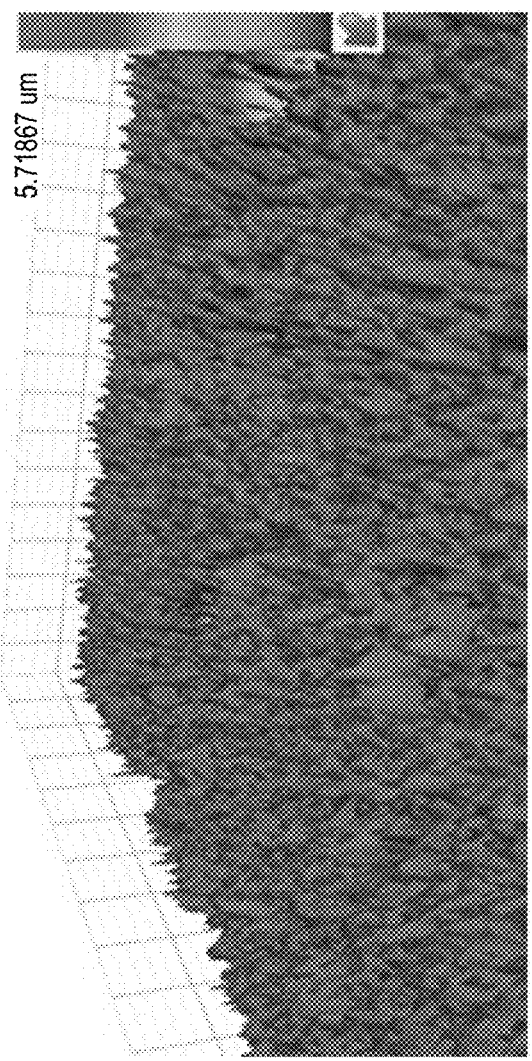
Figure 6D:
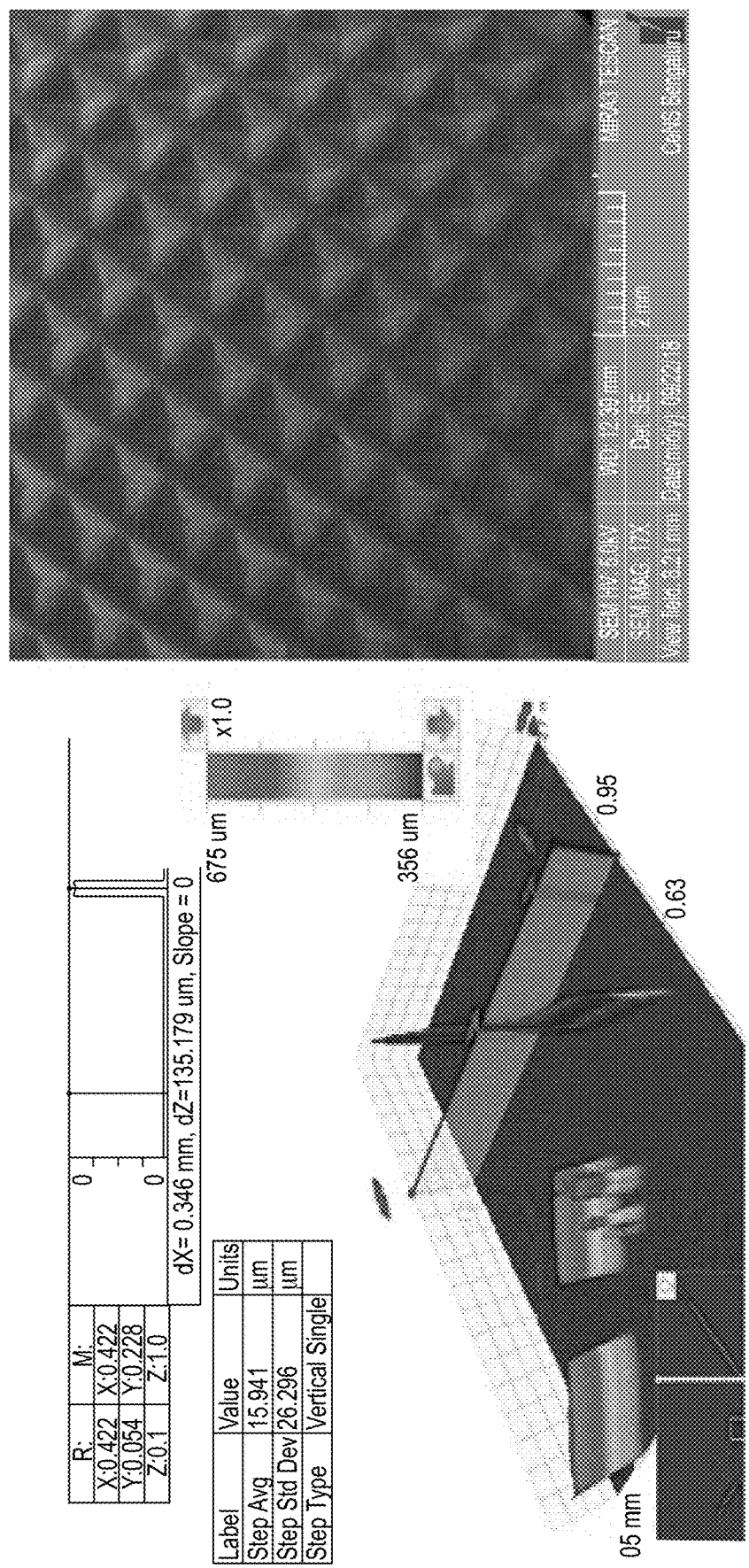

The textured glass by thermal imprinting have roughness of about 135 μm spread uniformly across the large area whereas the Grit blasted glasses and coarse sand blasted glasses have roughness of about 7 μm and about 4 μm respectively spread non-uniformly across larger area (FIG. 5). Fine sand blasted glass provides least and homogenous retention of the liquid which helps in the speedy recovery of the device from the former opacity state to the later because of the presence of roughness of about 1 μm spread evenly across the surface which makes it best suited for the said device (FIG. 6 and Table 2). Unwanted (droplets) regions of translucent states is notable in FIG. 5 highlighted within the white circles for metal grit, coarse sand blast glasses, whereas no such patterns are formed in translucent state for fine sand blasted glass device. However, textured glasses have transparency issues.

Experimental

Example 1: Referring FIG. 1, two glass sheets (1) and (4) of which at least one is roughened (1) are taken and stick together with spacer (2) made up of polyethylene terephthalate with desired thickness at the edges to create a cavity in between the glasses. The roughened surface of the glass is such that it faces the cavity. The composite device is sealed from all the sides leaving an opening for inlet/outlet (3) of the liquid as well as opening for venting in and out gas inside the micro cavity. The liquid composition (M) having same refractive index as roughened glass is filled into the cavity either manually or through a pumping device via the inlet/outlet (3) between the glass. The change in transparency can be observed while filling of the liquid. Transmittance is measured using spectrophotometer and switching speed is calculated using simple stop watch.

Example 2: Referring FIG. 1, two acrylic sheets (1) and (4) of which at least one is roughened (1) are taken and stick together with spacer (2) made up of polyethylene terephthalate with desired thickness at the edges to create a cavity in between the glasses. The roughened surface of the acrylic sheet is such that it faces the cavity. The composite device is sealed from all the sides leaving an opening for inlet/outlet (3) of the liquid as well as opening for venting in and out gas inside the micro cavity. The liquid mix (M) having same refractive index as roughened glass is filled into the cavity using electrical compressor by air pressure induced flow mechanism utilizing container-based arrangement via the inlet/outlet (3) between the glass. The change in transparency can be observed while filling of the liquid. FIG. 7(a) shows the device in translucent state when there is no liquid inside the device. Further, FIG. 7(b) shows the device in transparent start when filled with the novel liquid composition (M). FIG. 7(c) UV-vis spectra of the device confirms that the device becomes transparent after pumping the liquid (M) inside the device.

Example 3: The device made using method provided in example 1 and example 2 are filled with the liquid composition (M) using syringe utilizing piston-based pumping mechanism. FIG. 8(b), with the fluid nearly withdrawn from the microfluidic channels (the pump lever in the up position), the device is rendered uniformly translucent. No trace of liquid past the channels can be noted. The microfluidic channels when filled up to half the device height with pump lever half way down (FIG. 8(c)) are in partial translucent (top part) and partial transparent state (bottom half). Herein 'the curtain effect' can be realized. FIG. 8(d), with the microfluidic channels completely filled in with the liquid (pump lever is fully down), the device is rendered completely transparent. It is noted that no visual impression of the presence of channels or of the liquid within is found.

Figure 9:
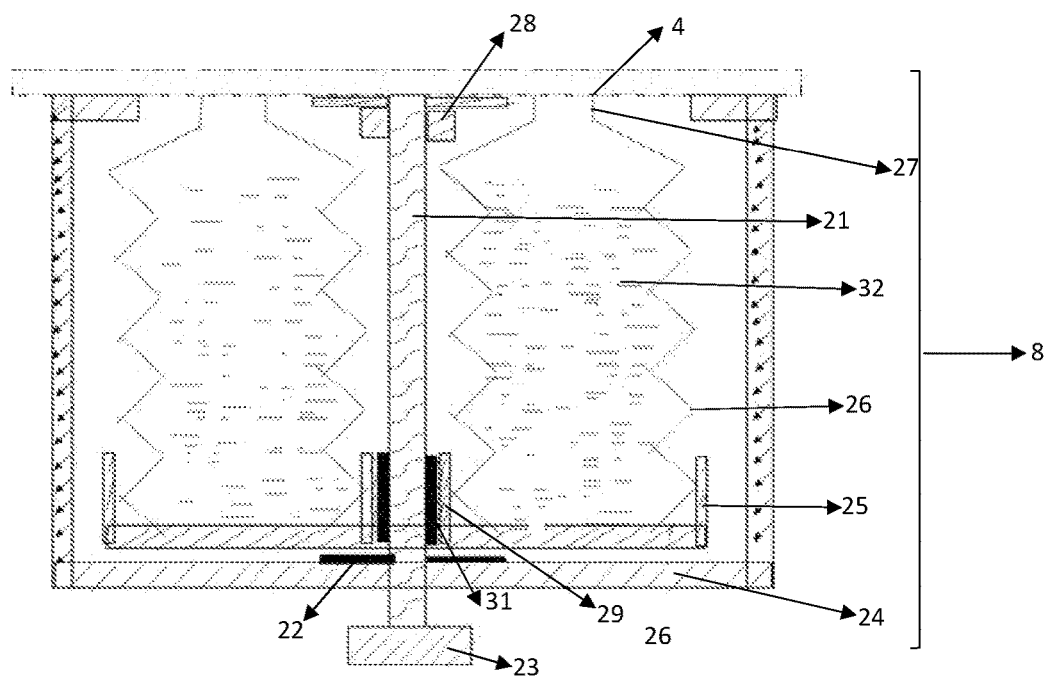
FIG. 9 shows the device with bellow compression/expansion-based pumping mechanism wherein (a) is schematic diagram of pumping method, (b) is device in translucent state, (c) is device in transparent state, (d) is close view of pumping mechanism, and (e) provides operation of pumping mechanism with knob rotation.
Figure 9:
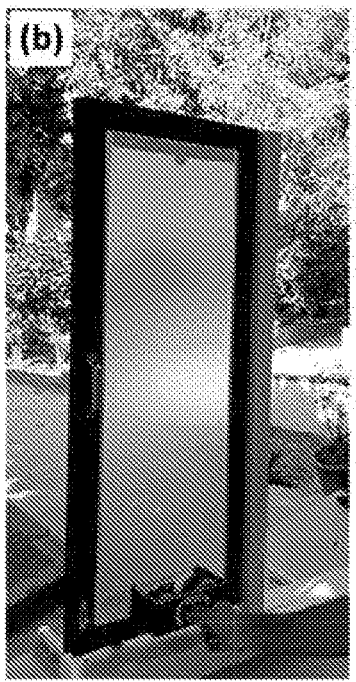
Figure 9:
Figure 9:
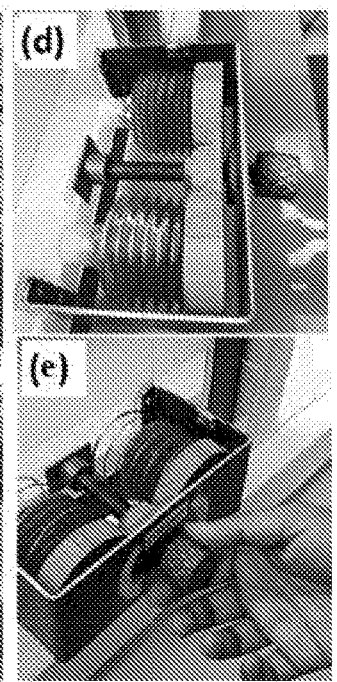
Figure 9:
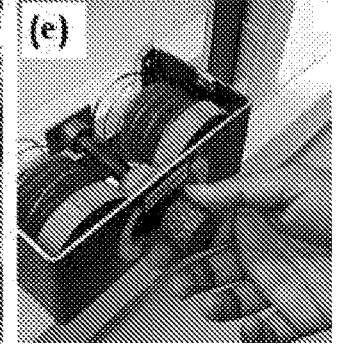

Example 4: The device made using method provided in example 1 and example 2 are filled with the liquid composition (M) using bellow compression/expansion-based pumping mechanism (FIG. 9). Curtain level can be switched between translucent and transparent state by knob rotation in clockwise and anti-clock wise direction, respectively. The device (A) is changed from translucent to transparent state or vice-versa by rotation of the rod [28] in clockwise and anti-clockwise direction, respectively. Bellow holder [25] which does UP/DOWN motion while rotating the rotation rod holder [28] in clockwise and anti-clockwise, respectively. This action reflects to the bellow[26] compression/expansion mechanism with rod rotation. When bellow [26] gets compressed the liquid inside [32] the bellow pushed into device [29] through hole [4] and [27] in the glass device and makes it transparent and device switches to translucent state when bellow [26] expansion happens while rotating the rod [28] in ant-clock wise direction.

Liquid is concealed inside the liquid pumping station [8] which contain bellow with pumping mechanism (FIG. 9(a)). Curtain level can be maintained as per need between translucent and transparent state by knob rotation in clockwise and anti-clock wise direction, respectively (FIG. 9(b) to 9(e)). This mechanism is having an advantage that knob handle does not project out even if the bellow is in full expanded state. This pumping mechanism can be upgraded into IOT based operation on the cost of extra electrical power for operation.

Figure 10:
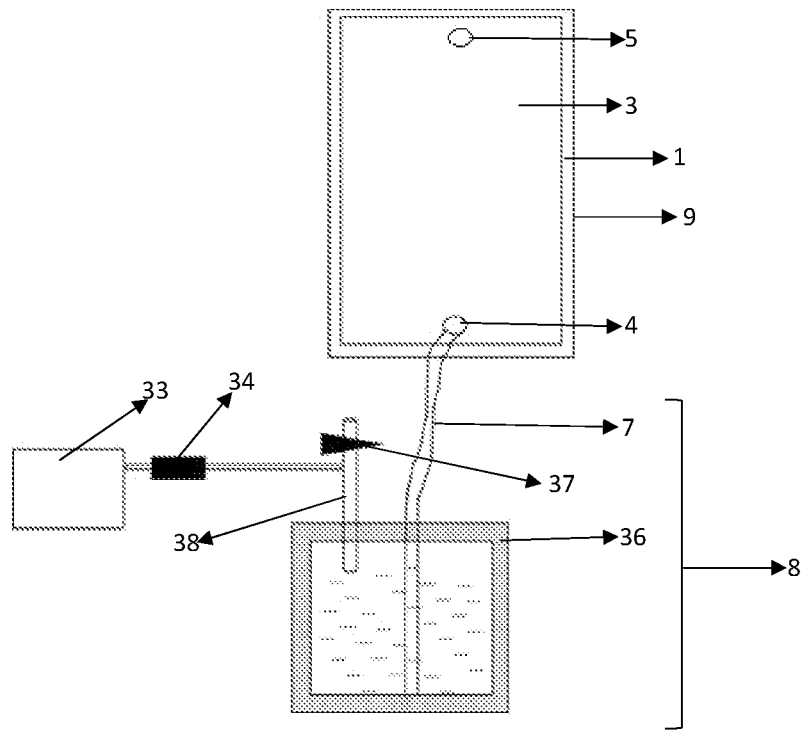
FIG. 10 shows the air-compressor based pumping mechanism (a) the schematic of liquid flow with air pressure induced flow, (b) is device in translucent state, (c) is device in transparent state.
Figure 10:
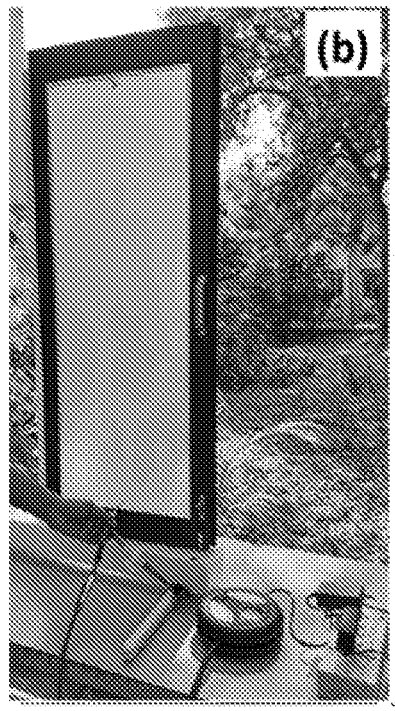
Figure 10:
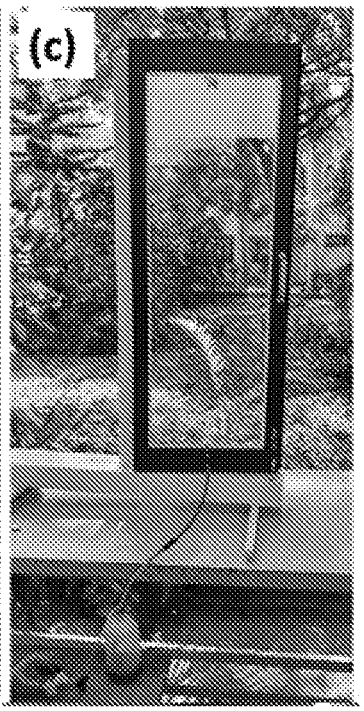

Example 5: The device made using method provided in example 1 and example 2 are filled with the liquid composition (M) using electrical compressor utilizing air pressure induced flow mechanism (FIG. 10). The electrical compressor is used to push in the liquid filled inside the container (M) inside the device to get transparent state (FIG. 10(c)) which can later be withdrawn from the device by releasing the pressure (FIG. 10(b)) to get the translucent state. When air compressor is on, it creates air pressure and flows through the non-returning valve [34] which make sure that air will not return to compressor and creates air pressure in container [36], while air-valve [37] will be in close state. This air-pressure will push the liquid M to glass device through inlet [4] via pipe [7] which will convert the glass device into transparent state. To switch the device from transparent state to translucent state one has to open the air valve [37] which will release the air pressure built inside the liquid container [36] and liquid will flow back to the container [36] from glass device through outlet [4] via pipes [7] due to gravity flow.

Figure 11:
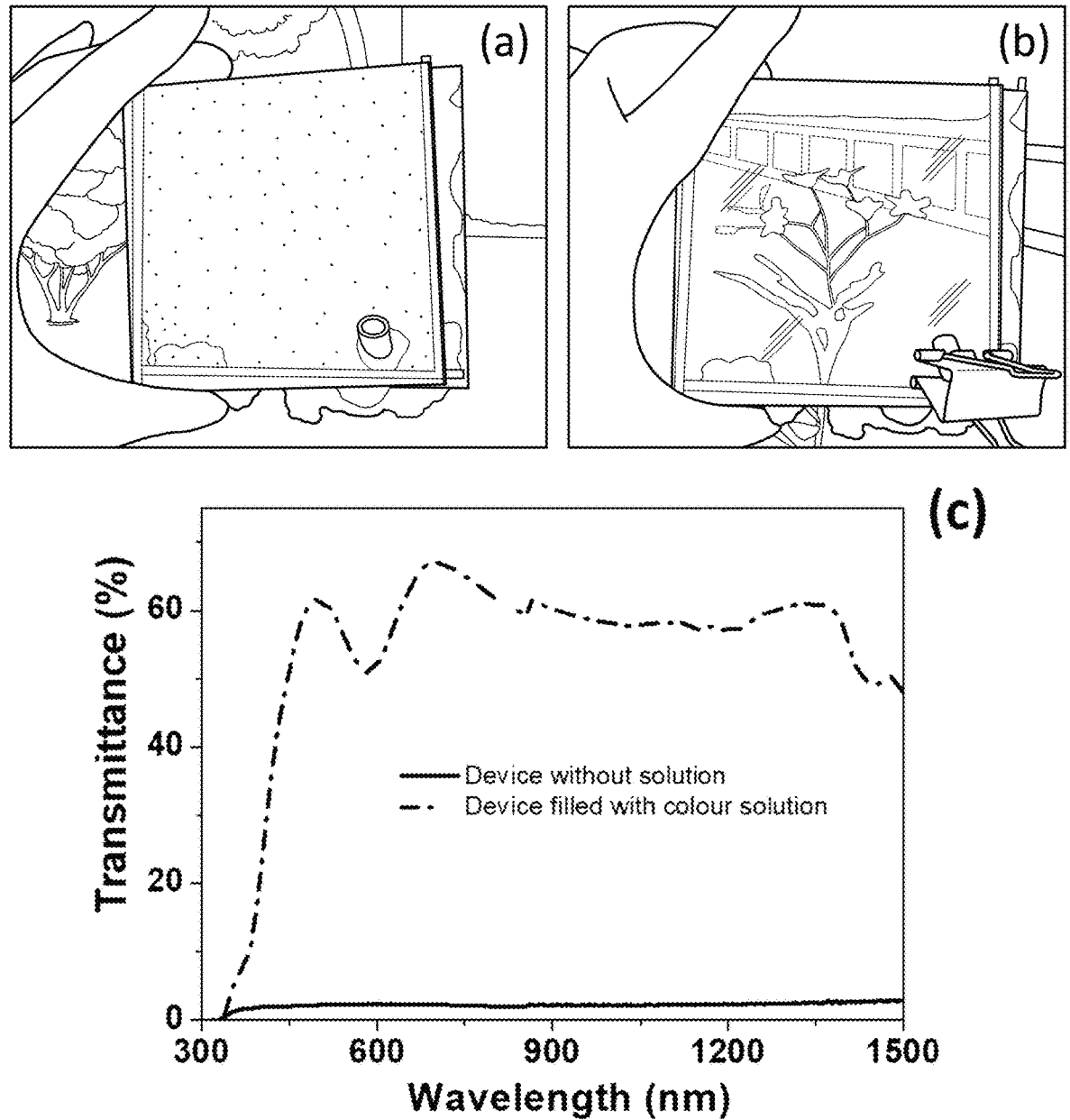
FIG. 11 shows coloured device in (a) in translucent state, (b) in transparent state after filling the colour liquid and (c) graphical presentation transmittance of the device in translucent and transparent states.

Example 6: The device made using method provided in example 1 and example 2 are filled with the liquid composition (M1) comprising two liquid components A and B wherein component A is selected from group of aromatic amines preferably Aniline, component B is selected from polyether preferably polyethylene glycol (PEG200) and indigo blue colour ink which are mixed together in fixed ratio to form M1. FIG. 11(a) shows the device in translucent state when there is no liquid inside the device and FIG. 11(b) shows the device in coloured transparent state when the device is filled completely with coloured liquid composition M1.

Transmittance for the device in transparent state is about 85% and in translucent state is about 5%. The device can block greater than 99% of UV rays and about 25-30% of IR rays as measured using Spectrophotometer. The switching Speed for opaque to transparent and from transparent to opaque is 5-30 Sec.

The visibility controlling device is created using non-expensive, reusable, readily available materials and uses negligible power in switching from opaque to transparent or transparent to opaque state in 5-30 Sec. The present invention furnishes a well-defined switching between the specularly transparent and highly translucent states with defined boundary and leaving no trace of the preceding state in the advancing state. The visibility controlling device of any size can be fabricated using transparent sheet of respective size with inexpensive non-hazardous components which are recyclable. Importantly, the device consumes no energy while being in any of the two states, and the only nominal consumption, if not operated manually, is during switching the states. It is envisaged that this new class of device will have a broad range of applications in automobile and modern infrastructure development industry due to its easily adaptable fabrication process and low cost.

We claim:

1. A synergistic liquid composition comprising aromatic amine ranging from 10%-90% by volume and polymer ranging from 90%-10% by volume for adopting in a visibility controlling device.

2. The synergistic liquid composition as claimed in claim 1, wherein the aromatic amine is Aniline and polymer is polyethylene glycol.

3. The synergistic liquid composition as claimed in claim 1, wherein the composition is optionally coloured with a colouring compound selected from a group but not limited to 2-(1,3-dihydro-3-oxo-2H-indazol-2-ylidene)-1,2-dihydro-3H-indol-3-one or 2,2'-Bis(2,3-dihydro-3-oxoindolyliden).

4. The synergistic liquid composition as claimed in claim 1, wherein the refractive index of liquid is ranging from 1.480 to 1.580.

5. A visibility controlling device with controlled regions of opacity and transparency comprising synergistic liquid composition of aromatic amine ranging from 10%-90% by volume and polymer ranging from 90%-10% by volume; wherein the visibility controlling device comprises a framework formed by two transparent sheets that are juxtaposed, with one sheet roughened on one side, the two transparent sheets being glued together and sealed by glue with a gap formed therebetween using a spacer, the framework comprising a hole for breathing; wherein said framework is connected through inlet/outlet port to a liquid pumping station filled with the synergistic liquid composition.

6. The visibility controlling device as claimed in claim 5 wherein the visibility is controlled from top to bottom, bottom to top, sideways, specific regions or combination thereof.

7. The visibility controlling device as claimed in claim 5, wherein the transparent sheets are selected from a group of material comprising glass, polymer or acrylic sheet.

8. The visibility controlling device as claimed in claim 5, wherein the roughness of the transparent sheet is in a range from 10 nm to 3 μm.

9. The visibility controlling device as claimed in claim 5, wherein the transparent glue is selected from a group comprising polyurethane-based glue, epoxy-based glue, α-cyanoacrylate based glue or silicon-based glue.

10. The visibility controlling device as claimed in claim 5, wherein the spacer is selected from a group comprising polyethylene terephthalate or polypropylene sheet.

11. The visibility controlling device as claimed in claim 5 wherein the gap between the sheet ranges from 10 μm to 500 μm.

12. The visibility controlling device as claimed in claim 5, wherein the visibility is controlled by the flow of liquid ranging from 1 $cm^3/s$ to 100 $cm^3/s$.

13. The visibility controlling device as claimed in claim 5, wherein the visibility is uniformly maintained by the flow of liquid with speed ranging from 1 $cm^3/s$ to 100 $cm^3/s$.

14. The visibility controlling device as claimed in claim 5, wherein the pumping station is controlled by manual pumping and/or electrical pumping mechanism.

15. The visibility controlling device as claimed in claim 5, wherein the device transmits light ranging from 80% to 90% in transparent state and 5% to 10% in translucent state.

16. The visibility controlling device as claimed in claim 5, wherein the device blocks 99% to 100% of UV rays and 25% to 30% of IR rays.

* * * * *